(12) United States Patent
Yamaguchi

(10) Patent No.: US 7,151,630 B2
(45) Date of Patent: Dec. 19, 2006

(54) RAMAN AMPLIFICATION REPEATER

(75) Inventor: Shohei Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 86 days.

(21) Appl. No.: 10/866,762

(22) Filed: Jun. 15, 2004

(65) Prior Publication Data

US 2004/0257640 A1 Dec. 23, 2004

(30) Foreign Application Priority Data

Jun. 20, 2003 (JP) ............................. 2003-176337

(51) Int. Cl.
*H01S 3/30* (2006.01)
(52) U.S. Cl. ...................... 359/334; 359/337; 398/181
(58) Field of Classification Search ................ 359/334, 359/337, 341.4; 398/181
See application file for complete search history.

(56) References Cited

U.S. PATENT DOCUMENTS

| | | | |
|---|---|---|---|
| 6,377,396 B1 * | 4/2002 | Sun et al. ............... | 359/341.42 |
| 6,510,000 B1 * | 1/2003 | Onaka et al. ............... | 359/334 |
| 2001/0019448 A1 * | 9/2001 | Yokoyama ............... | 359/334 |
| 2003/0011874 A1 | 1/2003 | Nakamoto et al. | |
| 2003/0072064 A1 | 4/2003 | Ohta | |

FOREIGN PATENT DOCUMENTS

| | | |
|---|---|---|
| EP | 1 265 381 | 12/2002 |
| JP | 2001-15845 | 1/2001 |
| JP | 2001-235772 | 8/2001 |
| WO | WO 03/069811 A1 * | 8/2003 |

* cited by examiner

*Primary Examiner*—Mark Hellner
(74) *Attorney, Agent, or Firm*—Young & Thompson

(57) ABSTRACT

A repeater according to the present invention includes a plurality of excitation light sources with varying center wavelengths for use as an excitation light source to achieve Raman amplification; and comprises a flatness monitoring circuit which monitors the flatness of signal light on a transmission line; a monitor control circuit which controls externally said excitation light sources based on a remote supervisory control signal and which determines which of said excitation light sources to control as appropriate according to the flatness of signal light identified by said flatness monitoring circuit; and a bandwidth selective reflector or LD modules which, under the control of said monitor control circuit, outputs said flatness information to another repeater as a remote supervisory control signal with a specific wavelength, via said transmission line.

14 Claims, 6 Drawing Sheets

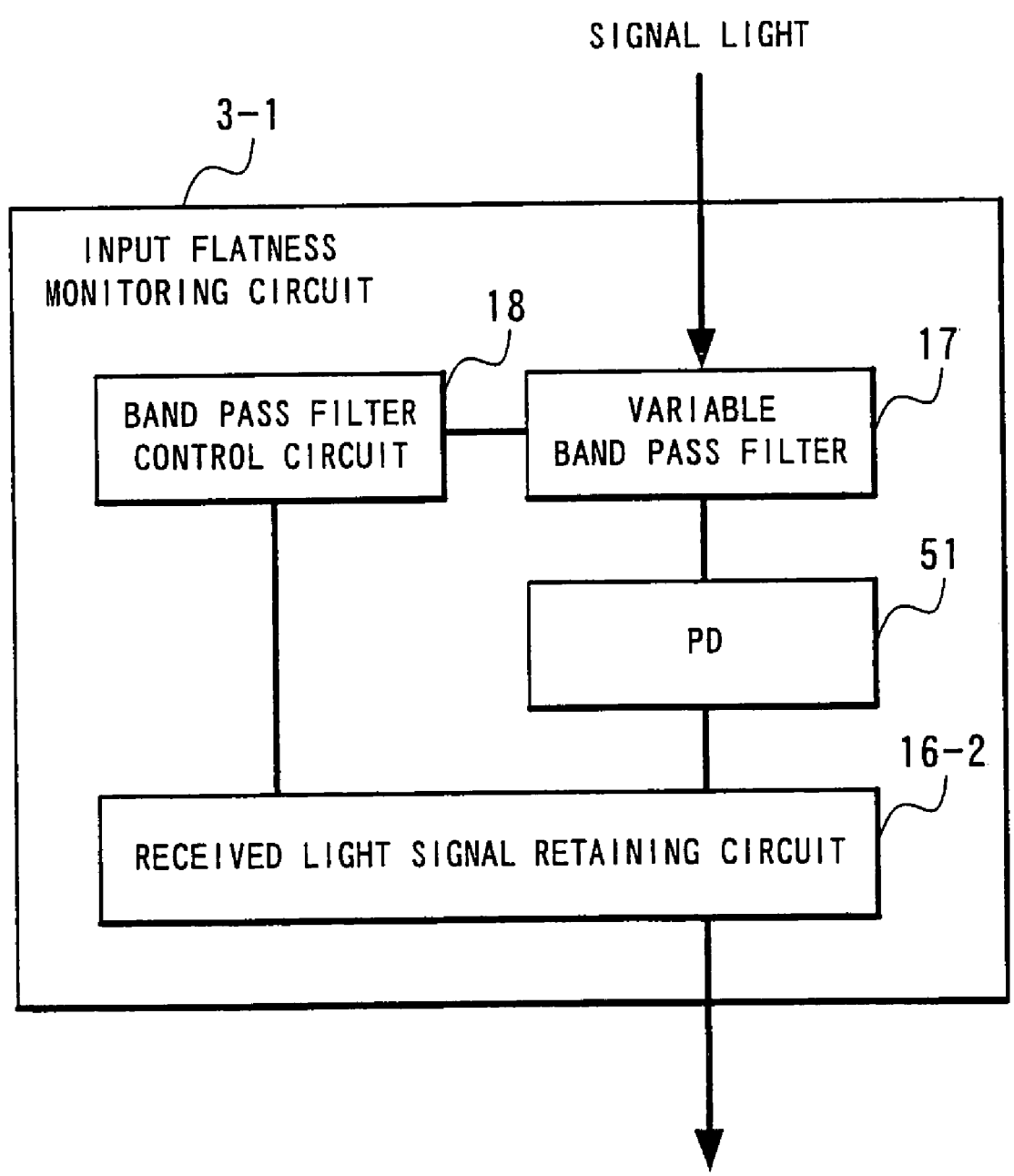

RAMAN AMPLIFICATION REPEATER

BACKGROUNDS OF THE INVENTION

1. Field of the Invention

The present invention relates to a Raman amplification repeater which utilizes amplification of signal light by Raman scattering that occurs when an excitation LD is input into a transmission line fiber. In particular, the present invention relates to a Raman amplification repeater which enables expansion of a signal bandwidth and external control of Raman amplification.

2. Description of the Related Art

The recent advancement of wavelength multiplexing technology has allowed current transmission systems to multiplex a wavelength into many, generating the necessity of repeaters (e.g., submarine repeaters) with wider bandwidths than in the past. Raman amplification is a technique effective in achieving a wider bandwidth in repeaters, and studies have actively been addressed to develop a repeater based on this technique. This repeater, called a "Raman amplification repeater," utilizes amplification of signal light by Raman scattering that occurs when an excitation LD in the 1480 nm bandwidth is input into a transmission line fiber.

Examples of such Raman amplification repeater include the ones disclosed in Japanese Patent Laying-Open (Kokai) No. 2001-15845 Official Gazette (Literature 1) and Japanese Patent Laying-Open (Kokai) No. 2001-235772 Official Gazette (Literature 2).

Literature 1 discloses a Raman amplification repeater which captures part of Raman-amplified output power and utilizes the light thus captured to control output power automatically, thereby eliminating the need of using a variable light attenuator for gain control.

Literature 2 discloses a Raman amplification repeater which introduces inspection light into a transmission line, receives the back scattered light generated while the inspection light propagates through the line, and then controls the power of excitation light based on the back scattered light it has received.

These conventional Raman amplification repeaters described above have a problem that the power of excitation light cannot be controlled externally after the transmission system is established.

There is also a problem that the signal bandwidth of signal light to be transmitted is defined in a narrow range, since the center wavelength of excitation light that is input into a transmission line fiber is set in a fixed manner.

SUMMARY OF THE INVENTION

An object of the present invention is to provide a Raman amplification repeater which enables the power of excitation light to be adjusted externally and which allows for an attempt to expand the signal bandwidth of transmitted signal light even after the transmission system is established.

According to the first aspect of the invention, a Raman amplification repeater which utilizes amplification of signal light by Raman scattering that occurs when an excitation LD is input into a transmission line fiber, comprising:

providing a plurality of excitation light sources with varying center wavelengths for use as an excitation light source to achieve Raman amplification; based on a remote supervisory control signal, determining externally which of the excitation light sources to control as appropriate according to the flatness of signal light on the transmission line; and outputting the flatness information to another repeater as a remote supervisory control signal with a specific wavelength, via the transmission line.

According to another aspect of the invention, a Raman amplification repeater which utilizes amplification of signal light by Raman scattering that occurs when an excitation LD is input into a transmission line fiber, comprising:

a plurality of excitation light sources with varying center wavelengths for use as an excitation light source to achieve Raman amplification; a flatness monitoring circuit which monitors the flatness of signal light on a transmission line; a monitor control circuit which controls externally the excitation light sources based on a remote supervisory control signal and which determines which of the excitation light sources to control as appropriate according to the flatness of signal light identified by the flatness monitoring circuit; and a control signal outputting part which, under the control of the monitor control circuit, outputs the flatness information to another repeater as a remote supervisory control signal with a specific wavelength, via the transmission line.

In the preferred construction, the plurality of excitation light sources, the flatness monitoring circuit, the monitor control circuit, and the control signal outputting part are provided on both the upstream and downstream sides, and control of the excitation light sources and transmission of remote supervisory control signals are performed independently between the upstream and downstream sides.

In another preferred construction, the control signal outputting part includes a bandwidth selective reflector which reflects the part of the signal light captured from the transmission line that has a specific wavelength.

In another preferred construction, the control signal outputting part is configured to incorporate a light source and a drive circuit for control signals, which output the part of the signal light that has a specific wavelength.

In another preferred construction, a configuration is adopted in which, as signal light on the transmission line, signal light that is output to the transmission line is input into the flatness monitoring circuit.

In another preferred construction, the flatness monitoring circuit comprises a branching circuit which branches the signal light into as many components as the number of the excitation light sources; a plurality of band pass filters provided for each of the branched component of signal light, a plurality of light receiving part provided for each of the branched component of signal light, and a received light signal retaining circuit which retains received signal light.

In another preferred construction, the flatness monitoring circuit comprises a variable band pass filter, a light receiving part, a received light signal retaining circuit which retains received signal light, and a band pass filter control circuit which controls the variable band pass filter as appropriate according to the output from the received light signal retaining circuit.

In another preferred construction, the Raman amplification repeater, wherein the plurality of excitation light sources, the flatness monitoring circuit, the monitor control circuit, and the control signal outputting part are provided on both the upstream and downstream sides; and control of the excitation light sources and transmission of remote supervisory control signals are performed independently between the upstream and downstream sides; and the control signal outputting part includes a bandwidth selective reflector which reflects the part of the signal light captured from the transmission line that has a specific wavelength.

In another preferred construction, the Raman amplification repeater, wherein the plurality of excitation light sources, the flatness monitoring circuit, the monitor control circuit, and the control signal outputting part are provided on both the upstream and downstream sides; and control of the excitation light sources and transmission of remote supervisory control signals are performed independently between the upstream and downstream sides; and the control signal outputting part is configured to incorporate a light source and a drive circuit for control signals, which output the part of the signal light that has a specific wavelength.

In another preferred construction, the Raman amplification repeater, wherein the plurality of excitation light sources, the flatness monitoring circuit, the monitor control circuit, and the control signal outputting part are provided on both the upstream and downstream sides; and control of the excitation light sources and transmission of remote supervisory control signals are performed independently between the upstream and downstream sides; and a configuration is adopted in which, as signal light on the transmission line, signal light that is output to the transmission line is input into the flatness monitoring circuit.

In another preferred construction, the Raman amplification repeater, wherein the plurality of excitation light sources, the flatness monitoring circuit, the monitor control circuit, and the control signal outputting part are provided on both the upstream and downstream sides; and control of the excitation light sources and transmission of remote supervisory control signals are performed independently between the upstream and downstream sides; and the flatness monitoring circuit comprises a branching circuit which branches the signal light into as many components as the number of the excitation light sources, a plurality of band pass filters provided for each of the branched component of signal light, a plurality of light receiving part provided for each of the branched component of signal light, and a received light signal retaining circuit which retains received signal light.

In another preferred construction, the Raman amplification repeater, wherein the plurality of excitation light sources, the flatness monitoring circuit, the monitor control circuit, and the control signal outputting part are provided on both the upstream and downstream sides, and control of the excitation light sources and transmission of remote supervisory control signals are performed independently between the upstream and downstream sides, and the flatness monitoring circuit comprises a variable band pass filter; a light receiving part, a received light signal retaining circuit which retains received signal light, and a band pass filter control circuit which controls the variable band pass filter as appropriate according to the output from the received light signal retaining circuit.

According to another aspect of the invention, an optical transmission provided with a Raman amplification repeater which utilizes amplification of signal light by Raman scattering that occurs when an excitation LD is input into a transmission line fiber, wherein the Raman amplification repeater includes a plurality of excitation light sources with varying center wavelengths for use as an excitation light source to achieve Raman amplification, and comprises a flatness monitoring circuit which monitors the flatness of signal light on a transmission line, a monitor control circuit which controls externally the excitation light sources based on a remote supervisory control signal and which determines which of the excitation light sources to control as appropriate according to the flatness of signal light identified by the flatness monitoring circuit, and a control signal outputting part which, under the control of the monitor control circuit, outputs the flatness information to another repeater as a remote supervisory control signal with a specific wavelength, via the transmission line.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 6 is a block diagram showing the configuration of the input flatness monitoring circuits of a Raman amplification repeater according to the sixth embodiment of the present invention.

DESCRIPTION OF THE PREFERRED EMBODIMENT

Figure 1:
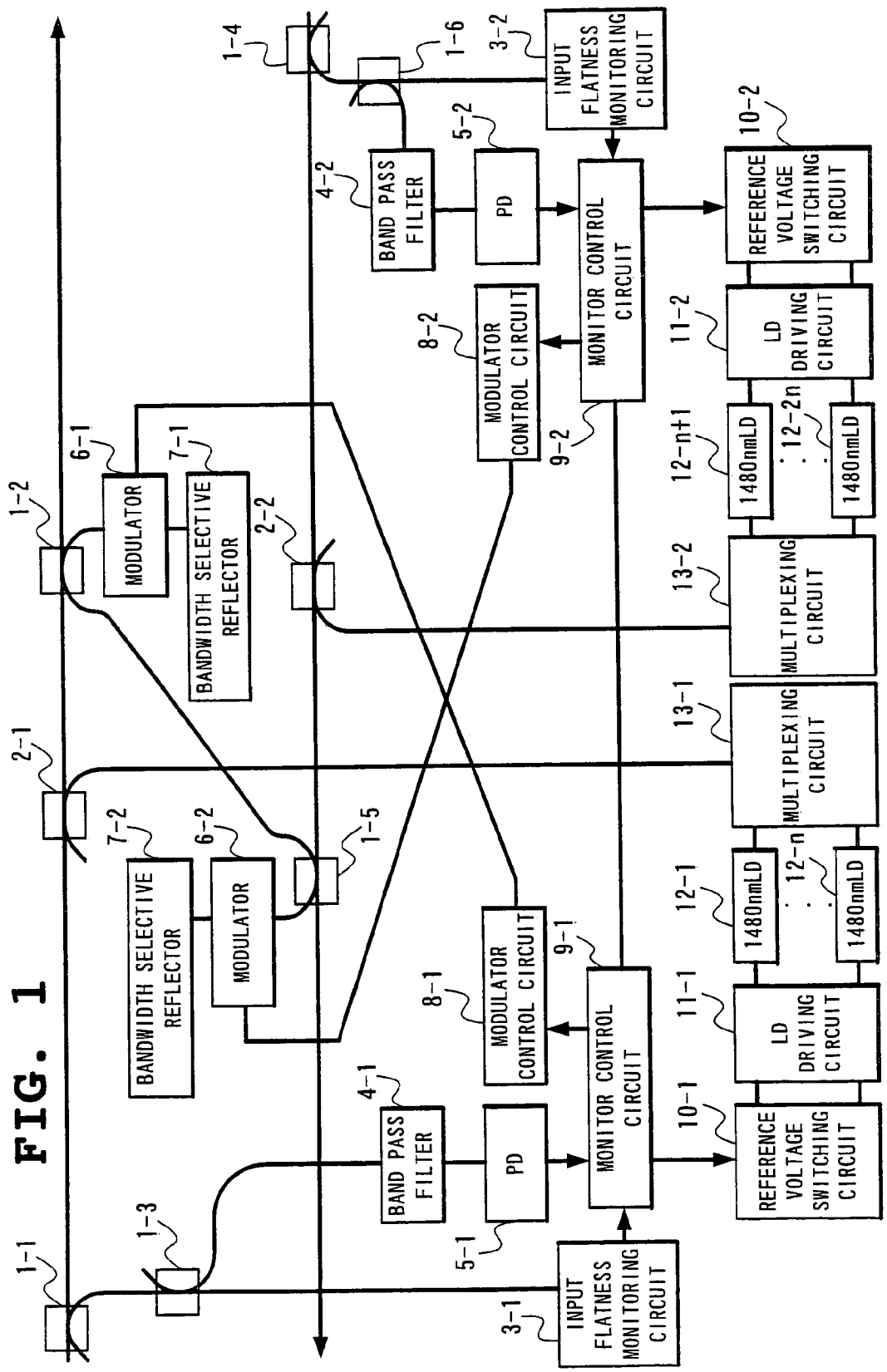
FIG. 1 is a block diagram showing the configuration of a Raman amplification repeater according to the first embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The preferred embodiments of the present invention will now be described in detail by referring to the drawings.

FIG. 1 shows the configuration of a Raman amplification repeater according to the first embodiment of the present invention. The Raman amplification repeater according to this embodiment, shown in FIG. 1, is of the same configuration between upstream and downstream directions, and includes upstream branch couplers 1-1, 1-2, 1-3 and downstream branch couplers 1-4, 1-5, 1-6; an upstream WDM (Wavelength Division Multiplex) coupler 2-1 and a downstream WDM coupler 2-2; an upstream input flatness monitoring circuit 3-1 and a downstream input flatness monitoring circuit 3-2; an upstream band pass filter 4-1 and a downstream band pass filter 4-2; an upstream PD (Photo Diode) module 5-1 and a downstream PD module 5-2; an upstream modulator 6-1 and a downstream modulator 6-2; an upstream bandwidth selective reflector 7-1 and a downstream bandwidth selective reflector 7-2; an upstream modulator control circuit 8-1 and a downstream modulator control circuit 8-2; an upstream monitor control circuit 9-1 and a downstream monitor control circuit 9-2; an upstream reference voltage switching circuit 10-1 and a downstream reference voltage switching circuit 10-2; an upstream LD driving circuit 11-1 and a downstream LD driving circuit 11-2; upstream 1480 nm LD (Laser Diode) modules 12-1 to 12-n and downstream 1480 nm LD module 12-n+1 to 12-2n; and an upstream multiplexing circuit 13-1 and a downstream multiplexing circuit 13-2.

Since the topology of components is the same between upstream and downstream directions, descriptions hereafter will be made in relation to the upstream components only.

One of the outputs from the branch coupler 1-1, into which signal light to be carried through a transmission line fiber will be input, is connected to one of the inputs into the WDM coupler 2-1. This output from the WDM coupler 2-1 is connected to one of the inputs into the branch coupler 1-2, and signal light is output to the transmission line from one of the outputs from the branch coupler 1-2.

The other input into the branch coupler 1-2 is connected to one of the inputs into the downstream branch coupler 1-5. The other output from the branch coupler 1-1 is connected to one of the inputs into the branch coupler 1-3. One of the outputs from the branch coupler 1-3 is connected to the input flatness monitoring circuit 3-1 and then to one of the inputs into the monitor control circuit 9-1.

The other output from the branch coupler 1-3 is connected to the band pass filter 4-1, then to the PD module 5-1 and finally to the other input into the monitor control circuit 9-1.

One of the outputs from the monitor control circuit 9-1 is connected to the reference voltage switching circuit 10-1 and then to the LD driving circuit 11-1. The output from the LD driving circuit 11-1 is connected to the plurality of the 1480 nm LD modules 12-1 to 12-n; after being multiplexed individually by the multiplexing circuit 13-1, the light output from these modules are connected to the other input into the WDM coupler 2-1.

The other output from the branch coupler 1-2 is connected to the modulator 6-1 and then to the bandwidth selective reflector 7-1. The other output from the monitor control circuit 9-1 is connected to the modulator control circuit 8-1 and then to the modulator 6-1. The monitor control circuit 9-1 is connected with the downstream monitor control circuit 9-2.

The Raman amplification repeater according to the first embodiment, having the configuration as shown in FIG. 1, is characterized by its function that allows the upstream and downstream outputs of the excitation laser to be changed from the outside, independently of each other. To realize this function, the repeater is provided with upstream and downstream monitor control circuits 9-1, 9-2.

The first embodiment operation will now be described in more detail, with focus on the operation to control excitation light and the operation to transmit remote supervisory control signals.

In the Raman amplification repeater according to the first embodiment, amplification of Raman scattering is achieved when laser light, emitted from the 1480 nm LD modules 12-1 to 12-n to produce a Raman gain, is output by the WDM coupler 2-1 to the transmission line fiber on the input side of the repeater. In order to expand the bandwidth of the repeater, the group of 1480 nm LD modules is made up of a plurality of modules with varying center wavelengths.

From the branch coupler 1-1, the repeater inputs the part of the signal light that has been captured from the branch coupler 1-3, into the input flatness monitoring circuit 3-1. By this, the repeater monitors the flatness of the input into the repeater and stores the flatness information in the monitor control circuit 9-1.

From the other output from the branch coupler 1-3, the repeater captures a remote supervisory control signal sent from a terminal (other repeater) only, and receives this remote supervisory control signal at the monitor control circuit 9-1. Based on this signal, the repeater controls the reference voltage switching circuit 10-1, and determines which of the 1480 nm LD modules 12-1 to 12-n it should control, based on the flatness information received from the input flatness monitoring circuit 3-1. By this, it becomes possible for the repeater to control one of the 1480 nm LD modules 12-1 to 12-n, namely control Raman amplification, based on the remote supervisory control signal input from the outside.

The flatness information stored in the monitor control circuit 9-1, which is internal information for use by the repeater, is handled as follows: The modulator 6-1 connected to the monitor control circuit 9-1 modulates the signal with a specific wavelength (the remote supervisory control signal), which is among the signals captured from the branch coupler 1-2 and which has been reflected by the bandwidth selective reflector 7-1. Following this, this information is directed to go through the branch coupler 1-2 and the downstream branch coupler 1-5 and is then transmitted to a terminal (other repeater) via the downstream side transmission line as a remote supervisory control signal. Otherwise, through the control by the downstream monitor control circuit 9-2 in a manner similar to the upstream counterpart, the remote supervisory control signal is transmitted to the a terminal (other repeater) through the upstream side transmission line.

Thus, the above-described Raman amplification repeater according to the first embodiment allows for an attempt to expand the signal bandwidth through use of a group of 1480 nm LD modules made up of a plurality of modules with varying center wavelengths to send out excitation light to a transmission line fiber. This repeater also allows for easy control by enabling the upstream and the downstream LD's to be controlled separately.

Moreover, this repeater enables the LD's to be adjusted even after the system is completed, because the LD's can be controlled based on the information obtained by monitoring the flatness of the input and because the LD's can be controlled externally.

Finally, the Raman amplification repeater according to this embodiment adopts a transmission method that modulates a specific wavelength internally before transmitting remote supervisory control signals to a terminal (other repeater). When compared with the commonly used modulation method that modulates an excitation LD, this method is more advantageous in that a main signal will not be affected.

Figure 2:
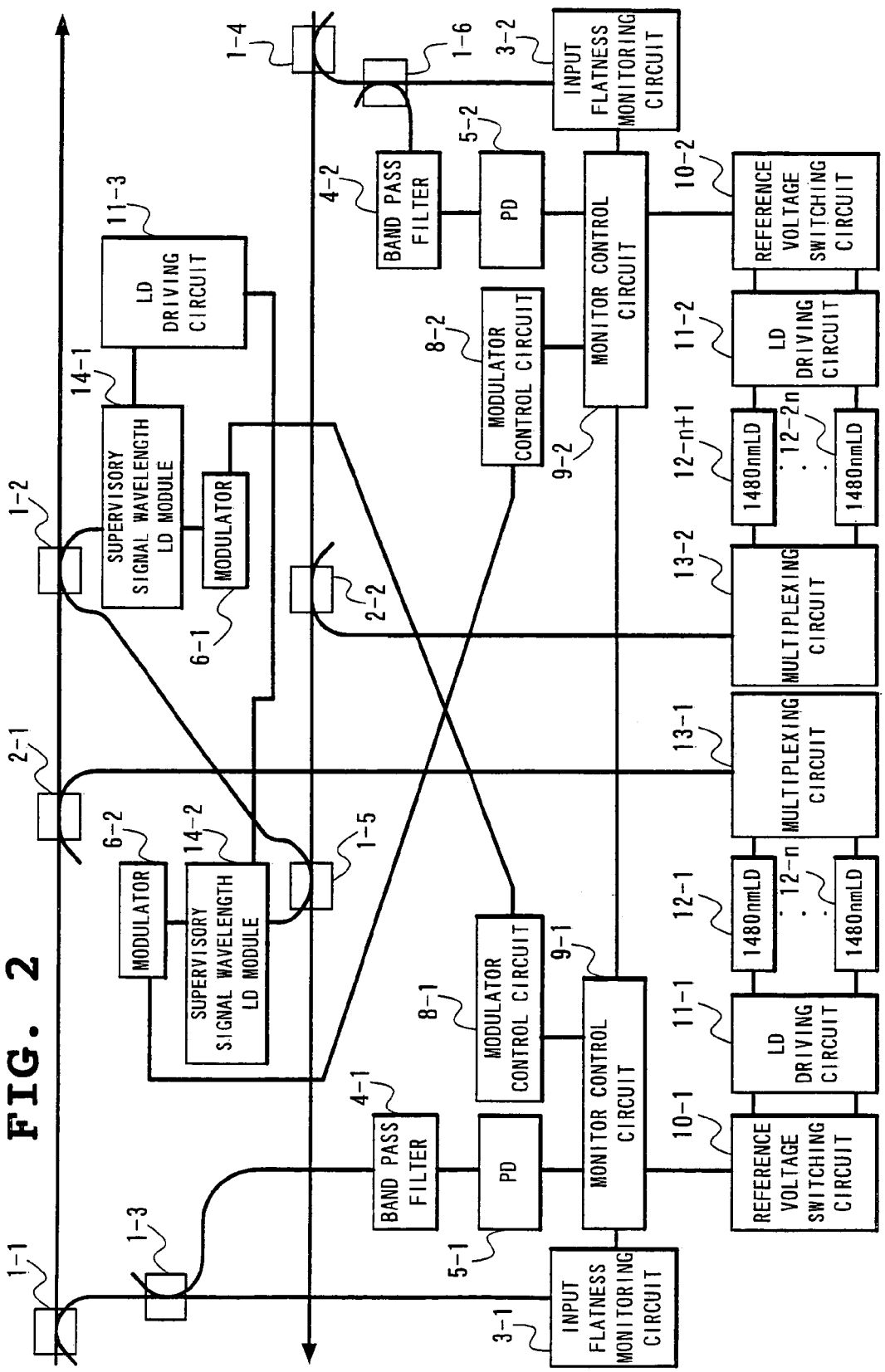
FIG. 2 is a block diagram showing the configuration of a Raman amplification repeater according to the second embodiment of the present invention.

Next, a Raman amplification repeater according to the second embodiment of the present invention will be described. FIG. 2 shows the configuration of a Raman amplification repeater according to the second embodiment of the present invention. The components of the second embodiment that are common with the first embodiment shown in FIG. 1 are assigned the same codes as those of the first embodiment; these components are omitted from the description below.

The Raman amplification repeater according to the second embodiment is different from the above-described repeater according to the first embodiment in several respects. Firstly, instead of using the upstream bandwidth selective reflector 7-1 and the downstream bandwidth selective reflector 7-2, it includes the upstream monitoring control wavelength LD module 14-1 between the upstream modulator 6-1 and the branch coupler 1-2. Secondly, between the downstream modulator 6-2 and the branch coupler 1-5, it has the downstream side monitoring control signal LD module 14-2. Finally, an LD driving circuit 11-3 is newly provided in this repeater. The rest of the configuration of this repeater is the same as the first embodiment.

On the upstream side, one of the outputs from the upstream monitor control circuit 9-1 is first connected to the modulator control circuit 8-1. It is further connected to the modulator 6-1, then to the upstream monitoring control signal LD module 14-1, and finally to one of the outputs from the upstream branch coupler 1-2. On the downstream side, one of the outputs from the downstream monitor control circuit 9-2 is connected to the modulator control circuit 8-2, to the modulator 6-2, then to the downstream monitoring control signal LD module 14-2, and finally to one of the outputs from the downstream branch coupler 1-5. As for the LD driving circuit 11-3, it is connected to the upstream monitoring control signal LD module 14-1 as well as to the downstream monitoring control signal LD module 14-2.

In terms of operation, the only difference of the second embodiment with a configuration as described above from the first embodiment is the method of transmitting remote supervisory control signals, which are internal information for use by the repeater; the rest of its operation is identical to the first embodiment. The transmission method for remote supervisory control signals according to the second embodiment will be described below.

As described above, this embodiment incorporates the monitoring control signal LD modules 14-1 and 14-2 and their associated LD driving circuits 11-3. Signal light from these monitoring-control signal LD modules is modulated by the modulators 6-1, 6-2 under the control of the monitor control circuits 9-1, 9-2. The modulated signal light is then directed to go through the branch coupler 1-2 and the branch coupler 1-5, and is finally transmitted to a terminal (other repeater) as a remote supervisory control signal via the downstream or upstream transmission line.

Figure 3:
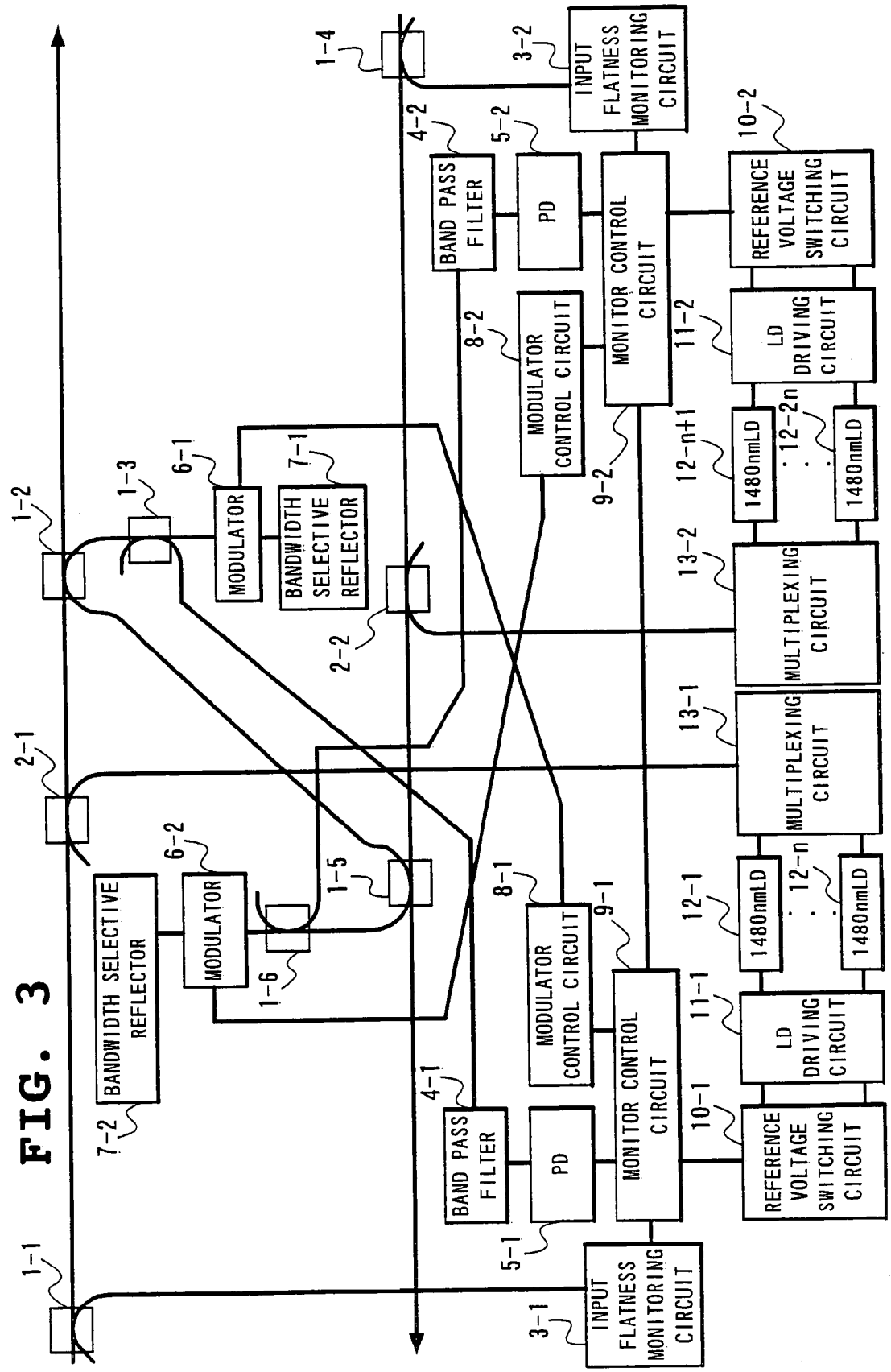
FIG. 3 is a block diagram showing the configuration of a Raman amplification repeater according to the third embodiment of the present invention.

Next, a Raman amplification repeater according to the third embodiment of the present invention will be described. FIG. 3 shows the configuration of a Raman amplification repeater according to the third embodiment of the present invention. The components of the third embodiment that are common with the first embodiment shown in FIG. 1 are assigned the same codes as those of the first embodiment; these components are omitted from the description below.

The Raman amplification repeater according to the third embodiment is the same as the first embodiment, except for the following: The branch coupler 1-3 is connected to the output of the upstream branch coupler 1-2. One of the outputs from the branch coupler 1-3 is input into the upstream monitor control circuit 9-1, via the upstream band pass filter 4-1 and the upstream PD (Photo Diode) module 5-1. To the output of the downstream branch coupler 1-5, the branch coupler 1-6 is connected. One of the outputs from this branch coupler 1-6 is input into the downstream monitor control circuit 9-2, via the downstream band pass filter 4-2 and the downstream PD (Photo Diode) module 5-2. The rest of the configuration of this repeater is the same as the first embodiment.

The operation of the Raman amplification repeater according to the third embodiment is the same as that of the first embodiment of FIG. 1, except that remote supervisory control signals are received by the monitor control circuit 9-1 from the branch coupler 1-3 connected to the output of the branch coupler 1-2 on the output-side of the repeater.

Figure 4:
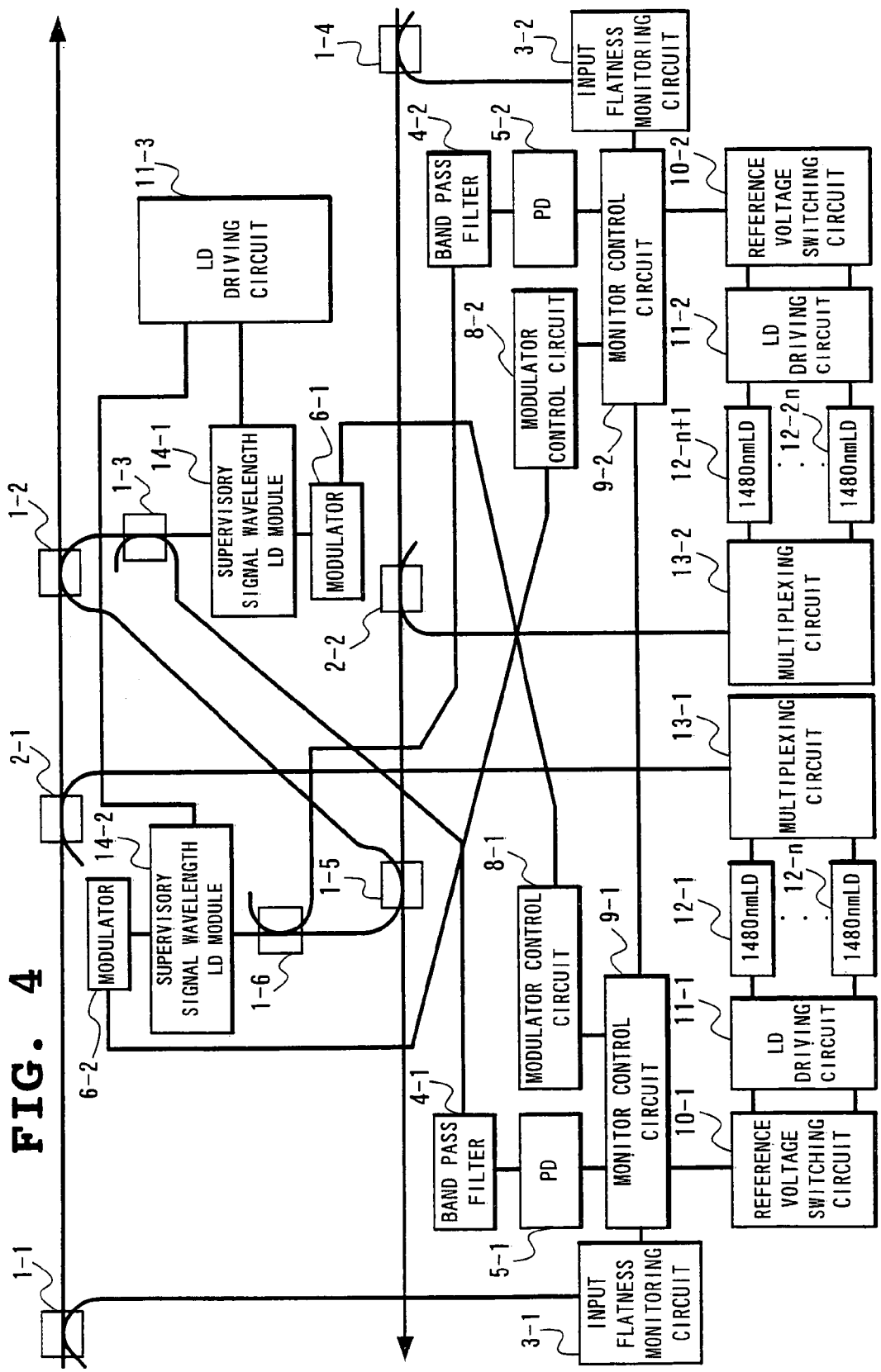
FIG. 4 is a block diagram showing the configuration of a Raman amplification repeater according to the fourth embodiment of the present invention.

Next, a Raman amplification repeater according to the fourth embodiment of the present invention will be described. FIG. 4 shows the configuration of a Raman amplification repeater according to the fourth embodiment of the present invention. The components of the fourth embodiment that are common with the first embodiment shown in FIG. 1 and the second embodiment shown in FIG. 2 are assigned the same codes as those of the first and second embodiments; these components are omitted from the description below.

The Raman amplification repeater according to the fourth embodiment is the same as the second embodiment, except for the following: The branch coupler 1-3 is connected to the output of the upstream branch coupler 1-2. One of the outputs from the branch coupler 1-3 is input into the upstream monitor control circuit 9-1, via the upstream band pass filter 4-1 and the upstream PD (Photo Diode) module 5-1. To the output of the downstream branch coupler 1-5, the branch coupler 1-6 is connected. One of the outputs from this branch coupler 1-6 is input into the downstream monitor control circuit 9-2, via the downstream band pass filter 4-2 and the downstream PD (Photo Diode) module 5-2. The rest of the configuration of this repeater is the same as the second embodiment.

The operation of the Raman amplification repeater according to the fourth embodiment is the same as that of the second embodiment of FIG. 2, except that remote supervisory control signals are received by the monitor control circuit 9-1 from the branch coupler 1-3 connected to the output of the branch coupler 1-2 on the output-side of the repeater.

Figure 5:
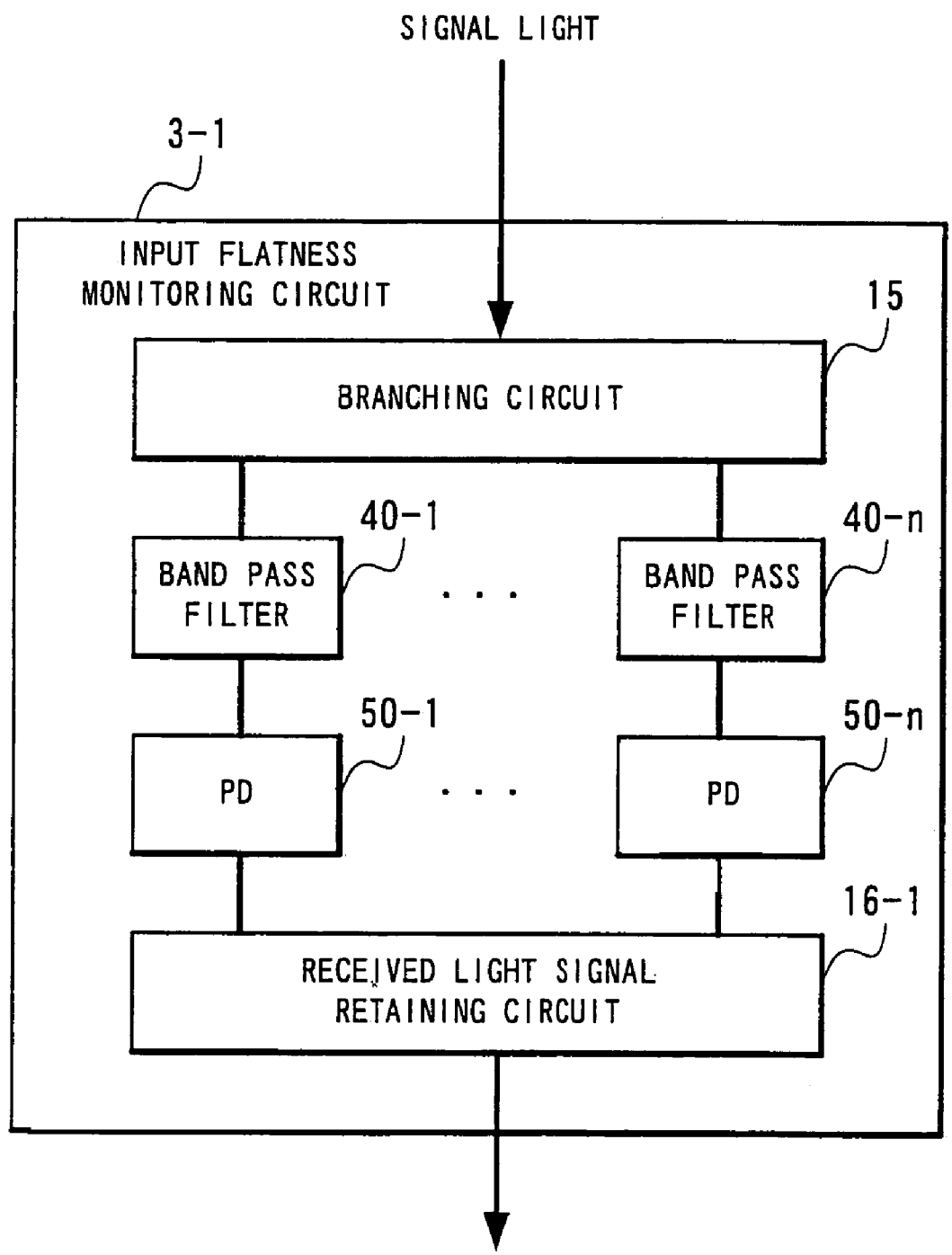
FIG. 5 is a block diagram showing the configuration of the input flatness monitoring circuits of a Raman amplification repeater according to the fifth embodiment of the present invention.

Next, a Raman amplification repeater according to the fifth embodiment of the present invention will be described. FIG. 5 is a block diagram showing the configuration of the input flatness monitoring circuits 3-1, 3-2 of a Raman amplification repeater according to the fifth embodiment of the present invention. This Raman amplification repeater may be of any of the general configurations according to the first to the fourth embodiments as shown in FIGS. 1 through 4.

Only the upstream input flatness monitoring circuit 3-1 will be described below; the same applies to the downstream input flatness monitoring circuit 3-2.

As shown in FIG. 5, signal light arriving through the branch coupler 1-1 is branched by the branching circuit 15 into as many components as the number of 1480 nm LD's 12-1 to 12-n (or 12-n+1 to 12-2n). The individual components of the signal light are then directed to go through the band pass filters 40-1 to 40-n and are input into the PD modules 50-1 to 50-n. The output of each of these PD modules 50-1 to 50-n is connected to the received light signal retaining circuit 16-1, whose output is configured to be the output of the input flatness monitoring circuit.

The reason for having the branching circuit 15 branch the signal light into as many components as the number of 1480 nm LD modules is to monitor correctly the power within the wavelength range over which each of the individual 1480 nm LD modules will be amplified.

Next, a Raman amplification repeater according to the sixth embodiment of the present invention will be described. FIG. 6 is a block diagram showing the configuration of the input flatness monitoring circuits 3-1, 3-2 of a Raman amplification repeater according to the sixth embodiment of the present invention. This Raman amplification repeater may be of any of the general configurations according to the first to the fourth embodiments as shown in FIGS. 1 through 4.

Only the upstream input flatness monitoring circuit 3-1 will be described below; the same applies to the downstream input flatness monitoring circuit 3-2.

As shown in FIG. 6, signals coming in via the branch coupler 1-1 are input into the received light signal retaining circuit 16-2 after going through the variable band pass filter 17 and the PD module 51. One of the outputs from the received light signal retaining circuit 16-2 is connected to the band pass filter control circuit 18 and then to the variable band pass filter 17, thereby enabling the output to be controlled.

Unlike the repeater of the configuration as shown in FIG. 5, the operation of this repeater uses the variable band pass filter 17 to ensure correct monitoring of the power within the wavelength range over which all the components of the 1480 nm LD will be amplified by the plurality of the LD modules.

While the present invention has been described by taking preferred embodiments and operations as examples, it should be noted that the present invention is not limited to the preferred embodiments and operations described above and that it can be implemented with a variety of modifications without departing from the spirit and scope of its technical principle.

As is clear from the descriptions above, by adopting a Raman amplification repeater according to the present invention, a number of beneficial effects can be achieved, as follows:

Firstly, an attempt can be made to expand the signal bandwidth, because a plurality of LD's with varying center wavelengths makes up the 1480 nm LD to send out excitation light to a transmission line fiber.

Secondly, control becomes easier, because the upstream and the downstream LD's can be controlled separately.

Thirdly, adjustment of the LD's is possible even after the transmission system is completed, because the LD's can be controlled based on the information obtained by monitoring the flatness of the input and because the LD's can be controlled externally by remote supervisory control signal.

Finally, when compared with the commonly used modulation method in Raman amplification repeater that modulates an excitation LD, there is an advantage that a main signal will not be affected, because a transmission method is adopted in which a specific wavelength is modulated internally in the repeater for transmission or remote supervisory control signal.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A Raman amplification repeater which utilizes amplification of signal light by Raman scattering that occurs when an excitation LD is input into a transmission line fiber, comprising:

means for providing a plurality of excitation light sources with varying center wavelengths for use as an excitation light source to achieve Raman amplification;

based on a remote supervisory control signal, means for determining externally which of said excitation light sources to control as appropriate according to the flatness of signal light on the transmission line; and means for outputting said flatness information to another repeater as a remote supervisory control signal with a specific wavelength, via said transmission line.

2. A Raman amplification repeater which utilizes amplification of signal light by Raman scattering that occurs when an excitation LD is input into a transmission line fiber, comprising:

a plurality of excitation light sources with varying center wavelengths for use as an excitation light source to achieve Raman amplification;

a flatness monitoring circuit which monitors the flatness of signal light on a transmission line;

a monitor control circuit which controls externally said excitation light sources based on a remote supervisory control signal and which determines which of said excitation light sources to control as appropriate according to the flatness of signal light identified by said flatness monitoring circuit; and a control signal outputting part which, under the control of said monitor control circuit, outputs said flatness information to another repeater as a remote supervisory control signal with a specific wavelength, via said transmission line.

3. The Raman amplification repeater as set forth in claim 2, wherein said plurality of excitation light sources, said flatness monitoring circuit, said monitor control circuit, and said control signal outputting part are provided on both the upstream and downstream sides, and control of the excitation light sources and transmission of remote supervisory control signals are performed independently between the upstream and downstream sides.

4. The Raman amplification repeater as set forth in claim 2, wherein said control signal outputting part includes a bandwidth selective reflector which reflects the part of the signal light captured from the transmission line that has a specific wavelength.

5. The Raman amplification repeater as set forth in claim 2, wherein said control signal outputting part is configured to incorporate a light source and a drive circuit for control signals, which output said part of the signal light that has a specific wavelength.

6. The Raman amplification repeater as set forth in claim 2, wherein a configuration is adopted in which, as signal light on said transmission line, signal light that is output to said transmission line is input into said flatness monitoring circuit.

7. The Raman amplification repeater as set forth in claim 2, wherein said flatness monitoring circuit comprises a branching circuit which branches said signal light into as many components as the number of said excitation light sources; a plurality of band pass filters provided for each of the branched component of signal light, a plurality of light receiving part provided for each of the branched component of signal light, and a received light signal retaining circuit which retains received signal light.

8. The Raman amplification repeater as set forth in claim 2, wherein said the flatness monitoring circuit comprises a variable band pass filter, a light receiving part, a received light signal retaining circuit which retains received signal light, and a band pass filter control circuit which controls said variable band pass filter as appropriate according to the output from the received light signal retaining circuit.

9. The Raman amplification repeater as set forth in claim 2, wherein said plurality of excitation light sources, said flatness monitoring circuit, said monitor control circuit, and said control signal outputting part are provided on both the upstream and downstream sides; and control of the excitation light sources and transmission of remote supervisory control signals are performed independently between the upstream and downstream sides; and said control signal outputting part includes a bandwidth selective reflector which reflects the part of the signal light captured from the transmission line that has a specific wavelength.

10. The Raman amplification repeater as set forth in claim 2, wherein said plurality of excitation light sources, said flatness monitoring circuit, said monitor control circuit, and said control signal outputting part are provided on both the upstream and downstream sides; and control of the excitation light sources and transmission of remote supervisory control signals are performed independently between the upstream and downstream sides; and said control signal outputting part is configured to incorporate a light source and a drive circuit for control signals, which output said part of the signal light that has a specific wavelength.

11. The Raman amplification repeater as set forth in claim 2, wherein said plurality of excitation light sources, said flatness monitoring circuit, said monitor control circuit, and said control signal outputting part are provided on both the upstream and downstream sides; and control of the excitation light sources and transmission of remote supervisory control signals are performed independently between the upstream and downstream sides; and a configuration is adopted in which, as signal light on said transmission line, signal light that is output to said transmission line is input into said flatness monitoring circuit.

12. The Raman amplification repeater as set forth in claim 2, wherein said plurality of excitation light sources, said flatness monitoring circuit, said monitor control circuit, and said control signal outputting part are provided on both the upstream and downstream sides; and control of the excitation light sources and transmission of remote supervisory control signals are performed independently between the upstream and downstream sides; and said flatness monitoring circuit comprises a branching circuit which branches said signal light into as many components as the number of said excitation light sources, a plurality of band pass filters provided for each of the branched component of signal light, a plurality of light receiving part provided for each of the branched component of signal light, and a received light signal retaining circuit which retains received signal light.

13. The Raman amplification repeater as set forth in claim 2, wherein said plurality of excitation light sources, said flatness monitoring circuit, said monitor control circuit, and said control signal outputting part are provided on both the upstream and downstream sides, and control of the excitation light sources and transmission of remote supervisory control signals are performed independently between the upstream and downstream sides, and said flatness monitoring circuit comprises a variable band pass filter; a light receiving part, a received light signal retaining circuit which retains received signal light, and a band pass filter control circuit which controls said variable band pass filter as appropriate according to the output from the received light signal retaining circuit.

14. An optical transmission system provided with a Raman amplification repeater which utilizes amplification of signal light by Raman scattering that occurs when an excitation LD is input into a transmission line fiber, wherein said Raman amplification repeater includes a plurality of excitation light sources with varying center wavelengths for use as an excitation light source to achieve Raman amplification, and comprises a flatness monitoring circuit which monitors the flatness of signal light on a transmission line, a monitor control circuit which controls externally said excitation light sources based on a remote supervisory control signal and which determines which of said excitation light sources to control as appropriate according to the flatness of signal light identified by said flatness monitoring circuit, and a control signal outputting part which, under the control of said monitor control circuit, outputs said flatness information to another repeater as a remote supervisory control signal with a specific wavelength, via said transmission line.

* * * * *